July 16, 1940.  W. EBERLE  2,207,787
CUTTING APPARATUS
Filed Sept. 17, 1938   2 Sheets-Sheet 1
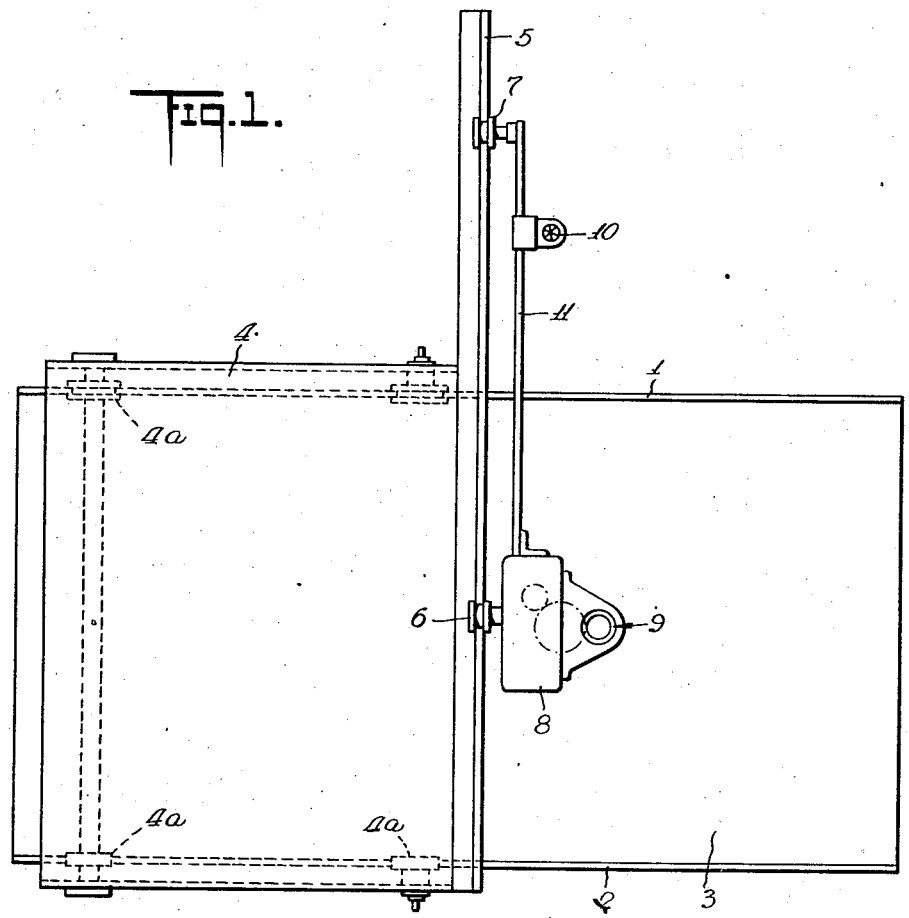
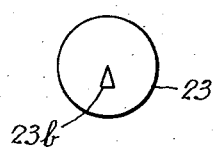
INVENTOR
*Wilhelm Eberle*
BY
*Dean Fairbank & Hirsch*
ATTORNEYS Patented July 16, 1940

2,207,787

UNITED STATES PATENT OFFICE 2,207,787

CUTTING APPARATUS

Wilhelm Eberle, Frankfort-on-the-Main, Germany, assignor to Messer & Company, G. m. b. H., Frankfort-on-the-Main, Germany, a company of Germany Application September 17, 1938, Serial No. 230,500
In Germany October 20, 1937

2 Claims. (Cl. 266—23)

The present invention relates to a hand steered metal cutting apparatus of the type in which a drawing or the like is traced to determine the path of a blow torch over the work piece, and in which the controlled movement of a motor driven traction wheel, traveling on a substantially plane surface, is transmitted to said blow torch.

It has been proposed to use the traction wheel as a tracer for following the lines of the drawing and to thereby predetermine the path of the blow torch. Such a machine is sufficiently accurate, if the outline of the cut to be made is comparatively simple. However, where the lines of the drawing are of intricate shape, it is difficult if not impossible to guide the tracer wheel with the required degree of accuracy.

It has been proposed to overcome such difficulties, by connecting the traction wheel to a tapered pin by a suitable transmission, to effect simultaneous movement of the wheel and pin and to utilize said pin as a tracing member to follow the lines of the drawing. Such a construction is not entirely satisfactory, since it would be necessary to move the tapered pin along in contact with or very close to the surface of the drawing. This makes it necessary for the drawing to be laid perfectly flat on a table, for if the drawing bulges outwardly at any section, the tapered pin might tear or disarrange it. If the space between the lower end of the pin and the surface of the drawing is too large, then it is impossible to accurately guide said pin along the lines of the drawing.

It has been suggested to guide the blow torch automatically along the lines of the drawing by photoelectric means, but such a construction is so complicated and so expensive, that it is not suitable for the usual commercial oxy-acetylene cutting machines.

One object of the present invention is to eliminate the disadvantages above referred to.

As an important feature of the present invention, a bright light ray is used for guiding the blow torch over the work piece. This may be produced by an optical device located near and geared to the traction wheel for simultaneous movement therewith. The light spot projected on the drawing by this light ray is desirably in the form or shape of a directional marker, as for instance spider lines, or a triangle, to indicate the direction of its movement. The apparatus is steered by hand to guide the light spot along the cutting lines of the drawing, and cause a corresponding movement of the blow torch along the work piece to be cut. By means of this construction, the light spot can be traced over the contours of the drawing with much greater accuracy and ease than any other device hitherto known. Furthermore, it is not necessary that the view of the operator guiding the machine be directed to the point of contact between the drawing and the traction wheel.

The shape as well as the color of the light spot may be changed to suit varied requirements. For instance, when tracing a standard black and white drawing, a bright white light spot would be desirable, while on blueprints, a black light spot with a white edge is preferable. Such a spot can be produced by the use of colored filters, masks and the like.

Various other objects, features and advantages of the invention will be apparent from the following particular description, and from an inspection of the accompanying drawings, in which:

Fig. 1 is a top plan view of an apparatus embodying the present invention and shown somewhat diagrammatically;

Fig. 3 shows one form of light spot produced by the optical device, and which may be used.

Figure 2:
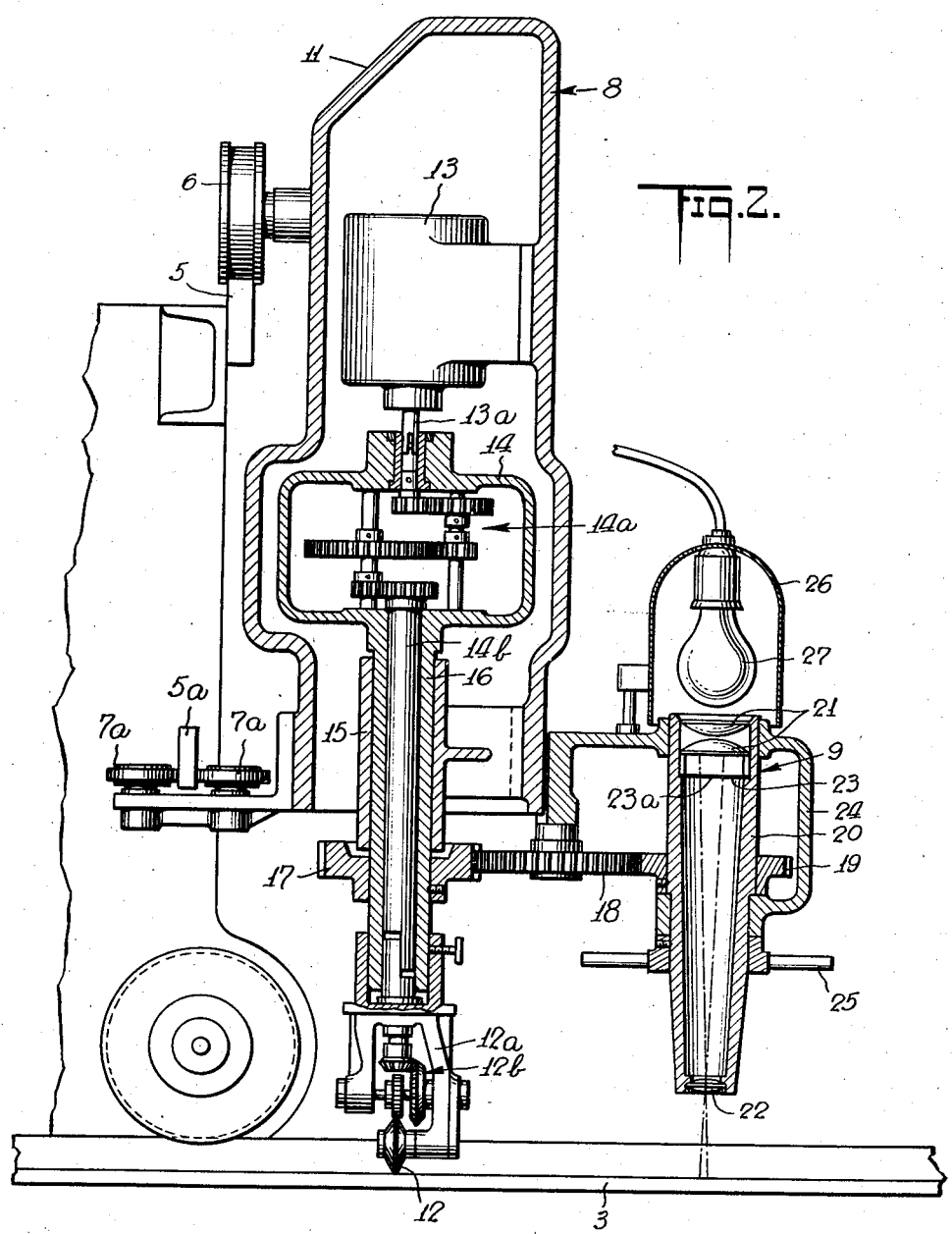
Fig. 2 is a side elevation, partly in section and on a larger scale, through the driving mechanism and the optical device for producing the light spot.

In the specific embodiment of the invention shown in the drawings, the cutting apparatus is of the so-called cross carriage type, in which the carriage 4 has rollers 4a adapted to travel over the side rails 1 and 2 of a horizontal table 3, and is provided with rails 5 and 5a for guiding the movement of a second carriage 11, traveling by means of rollers 6, 7, and 7a, in a direction at right angles to the direction of movement of said first carriage 4. The carriage 11 carries a driving mechanism 8, an optical device 9 adjacent thereto, and a blow torch 10 adapted to travel over the work piece to be cut.

The driving mechanism 8 comprises a motor 13, a traction wheel 12 in the form of a knurled roller traveling over the table 3, and a transmission between said motor and said traction wheel. This transmission includes a reduction gear unit 14a enclosed and mounted in a housing 14 to form a rotatable unit therewith. The motor shaft 13a is journalled in and forms an axis for said housing, and coaxial with said motor shaft is a shaft 14b rotatable in a vertical tubular extension 16 of said housing 14. This tubular extension 16 is journalled in a sleeve bearing 15, and is connected at its lower end to a bracket 12a, supporting the traction wheel 12, and a transmission 12b between said traction wheel and the shaft 14b. In this manner, the traction wheel 12 is rotated about its own axis from the motor 13, while permitting said traction wheel to swivel about the vertical axis of the shaft 14b as said traction wheel travels over the horizontal table 3.

The optical device 9 includes a source of light 27, enclosed in a reflector 26, and disposed over the upper end of a vertical tube 20 journalled in a bracket 24 and disposed substantially parallel to the tube 16. The upper end of the tube 20 carries a condensing lens unit shown in the form of two plano-convex lenses 21, and the lower end supports a double convex lens 2. Disposed in the tube 20 between the two lens units is a mask plate 23, having an opening 23a, which corresponds to the desired shape of the light spot or marker 23b projected on the surface of the drawing, and which is shown in the form of a triangle in Fig. 3. It is not essential that the light spot be of triangular form, but it should be of some non-circular form so that the light spot may be rotated to bring a predetermined corner or part of it into proper orientation or registration with the line of the drawing to be followed.

In order to steer the apparatus in tracing relationship with respect to a pattern or drawing on the table 3, and to effect the rotation of the tube 20, said tube is provided with a handle 25. The steered movement of the light spot along the lines of the drawing is transmitted to the traction wheel 12 by means of a train of gears including a gear 19 affixed to the tube 20, a gear 17 affixed to the tube 16 of the reduction gear housing 14, and an intermediate gear 18. The two gears 17 and 19 are desirably of the same pitch diameter and have the same number of teeth, so that the rotation of the tube 20 during steering maneuvers causes the corresponding rotation of the tube 16, and the corresponding rotation of the traction wheel 12 about a vertical axis.

In the operation of the apparatus, a drawing showing the shape of the piece to be cut is placed on the table 3 in such a way, that the triangular light spot 23b produced has its apex touching the starting point of the drawing corresponding to the initial cutting point of the work piece underneath the blow torch 10. The motor 13 is then started, to drive the traction wheel 12, and thereby cause a travel of the blow torch 10 determined by the movement of the two carriages 4 and 11 along their respective rails. By moving the handle 25 so that the apex of the light spot 23b follows the lines of the drawing, the blow torch 10 is made to follow a corresponding cutting path over the work piece. The particular mechanism illustrated constitutes only one of many forms and arrangements of operating parts which may be employed in carrying out my invention.

Having thus described my invention, what I claim as new and desire to secure by Letters Patent is:

1. An apparatus for cutting in accordance with a drawing, including a carriage movable in any horizontal direction, a pair of vertical tubes and a torch all mounted on said carriage, said tubes being rotatable about their respective axes, a traction wheel mounted at the lower end of one of said tubes, means extending through said last mentioned tube for driving said traction wheel to move the carriage, means for projecting a light spot of non-circular shape through the other tube onto the drawing, and means for rotating said tubes simultaneously about their respective axes to maintain the light spot in predetermined orientation in respect to a line on the drawing during the movement of the light spot along said line.

2. An apparatus for cutting in accordance with a line on a drawing, including a table for supporting said drawing, a carriage movable in any horizontal direction over said table, means on said carriage for projecting a non-circular spot of light on the drawing, said means including a source of light, a lens for projecting a light spot from said source onto the drawing, and a mask having a non-circular opening in the path of light and determining the shape of the light spot, said mask being mounted for rotational movement, a steerable traction wheel mounted on said carriage for moving the latter, means for driving said traction wheel, means connecting said traction wheel and said mask for insuring simultaneous orienting of the light spot in respect to the drawing and steering of the wheel along a path corresponding to said line of the drawing, and a cutting torch also mounted on said carriage and movable along a path determined by the path of movement of the light spot.

WILHELM EBERLE.